(12) United States Patent
Barraclough et al.

(10) Patent No.: US 6,226,031 B1
(45) Date of Patent: *May 1, 2001

(54) VIDEO COMMUNICATION/MONITORING APPARATUS AND METHOD THEREFOR

(75) Inventors: Keith Barraclough, Menlo Park; Bryan R. Martin, Campbell; Hedley Rainnie, Santa Clara, all of CA (US)

(73) Assignee: Netergy Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/176,994

(22) Filed: Oct. 22, 1998

Related U.S. Application Data (63) Continuation-in-part of application No. 09/005,053, filed on Jan. 9, 1998, which is a continuation-in-part of application No. 08/908,826, filed on Aug. 8, 1997, now Pat. No. 5,790,712, which is a continuation of application No. 08/658,917, filed on May 31, 1996, now abandoned, which is a continuation of application No. 08/303,973, filed on Sep. 9, 1994, now abandoned, which is a continuation of application No. 07/838,382, filed on Feb. 19, 1992, now Pat. No. 5,379,351.

(51) Int. Cl.$^7$ ................................................. H04N 7/14
(52) U.S. Cl. ..................................... 348/14.13; 348/14.01
(58) Field of Search ..................... 348/7, 12–20, 348/407, 413, 415, 417; 382/423, 166, 232–236; 358/41, 56, 432; 364/723, 724.015; 379/93.17, 93.24, 202, 102.02; 345/502, 508, 519; 712/20, 23, 35, 215

(56) References Cited

U.S. PATENT DOCUMENTS

| | | | |
|---|---|---|---|
| 5,003,532 | * | 3/1991 | Ashida et al. ........................ 348/15 |
| 5,197,140 | * | 3/1993 | Balmer ................................ 712/20 |
| 5,212,742 | * | 5/1993 | Normile et al. ..................... 382/56 |
| 5,347,305 | * | 9/1994 | Bush et al. .......................... 348/17 |
| 5,379,351 | | 1/1995 | Fandrianto et al. ................. 382/41 |
| 5,410,649 | * | 4/1995 | Gove .................................. 345/505 |
| 5,438,357 | * | 8/1995 | McNelley .......................... 348/15 |

(List continued on next page.)

OTHER PUBLICATIONS

ITU–T Recommendation H.320, Series H: *Transmission of Non–Telephone Signals, Narrow–band Visual Telephone Systems and Terminal Equipment*, ITU–T Study Group 15 (1993–1996).

Draft ITU–T Recommendation H.323, *Line Transmission of Non–Telephone Signals, Visual Telephone Systems and Equipment for Local an Area Networks which Provide a Non–guaranteed Quality of Service*, ITU–T Study Group 15, May 28, 1996.

Draft ITU–T Recommendation H.324, *Line Transmission of Non–Telephone Signals, Terminal for Low Bitrate Multimedia Communication*, ITU–T Study Group 15, Nov. 22, 1995.

*Primary Examiner*—Curtis Kuntz
*Assistant Examiner*—George Eng (57) ABSTRACT

In one embodiment, a cost-effective videophone device acts as a security monitor and includes a programmable processor circuit capable of communicating over a conventional communications channel, such as a POTS line, and of generating video data for display on a television set. The device includes a video source, an interface circuit, including a modem transmitting and receiving video and audio data over the channel; an EEPROM circuit for storing a program to control the videophone apparatus; and a display driver circuit for generating video data to the display. The programmable processor circuit includes a DSP-type processor for processing video data and a general-purpose processor for executing the stored program and controlling the operation of the videophone apparatus. Further, a code is used to designate one of multiple operations for various interacting processor circuits communicating in the same system.

31 Claims, 5 Drawing Sheets

U.S. PATENT DOCUMENTS

| | | | |
|---|---|---|---|
| 5,541,640 | * 7/1996 | Larson | 348/19 |
| 5,581,297 | 12/1996 | Koz et al. | 348/152 |
| 5,664,021 | 9/1997 | Chu et al. | 379/202 |
| 5,737,431 | 4/1998 | Brandstein et al. | 381/92 |
| 5,751,338 | * 5/1998 | Ludwig, Jr. | 379/93.17 |
| 5,926,208 | * 7/1999 | Noonen et al. | 348/17 |

* cited by examiner

VIDEO COMMUNICATION/MONITORING APPARATUS AND METHOD THEREFOR

RELATED APPLICATIONS

This is a continuation-in-part of U.S. patent application Ser. No. 09/005,053, filed Jan. 9, 1998 now U.S. Pat. No. 6,124,882, issued Sep. 26, 2000 (11611.51US01), which is a continuation-in-part of U.S. patent application Ser. No. 08/908,826, filed on Aug. 8, 1997 (now U.S. Pat. 5,790,712), which is a continuation of U.S. patent application Ser. No. 08/658,917, filed on May 31, 1996 (now abandoned), which is a continuation of U.S. patent application Ser. No. 08/303,973, filed Sep. 9, 1994 (now abandoned), which is a continuation of U.S. patent application Ser. No. 07/838,382, filed on Feb. 19, 1992, (now U.S. pat. No. 5,379,351).

FIELD OF THE INVENTION

The present invention relates to image communication systems, and more particularly, to video communication directed to monitoring applications, among others security applications.

BACKGROUND OF THE INVENTION

Image communication systems span a variety of applications. One such application is security monitoring. Security monitoring typically involves system control and display functions located at a central station. The central station includes multiple emanating video-communication paths, each path connecting to a remotely-located display camera. Traditionally, the significant expense of security monitoring systems has limited their practicability to larger facilities.

Recent developments in communication standards and compression/decompression techniques have permitted enhanced security-system implementations. One generally-described approach involves using a remote camera that responds to changes in motion or audio as a determining factor for transmitting captured video and audio data to the control station. Another approach uses a remote server station that connects to several cameras, with the server station coupling to a telephone line for reporting back to the control station. These and other recent implementations are directed to markets ranging from retail shops to large industrial warehouses.

Widespread acceptance and usage of security-system implementations are largely a function of cost. As with most other systems, reduced cost is realized through cost-effective mass production. The initial costs to effect such a mass production, however, can be exorbitant. Moreover, widespread acceptance and usage of such technology cannot be forced, even when appropriately addressing the marketing needs and overcoming the exorbitant costs of the mass production equipment. Consequently, efforts to launch the appropriate technology for practicable acceptance and usage of security systems has been difficult.

SUMMARY OF THE INVENTION

The present invention is directed to a programmable video communication arrangement and method for monitoring applications, such as security. According to one example embodiment, a monitoring arrangement communicates video and audio data over a conventional communications channel, such as a POTS line, cellular, other wireless and other digital communication media. The arrangement includes: a video source configured and arranged to capture images and to generate video data representing monitored images; a telephone line interface circuit, including a signal transceiver circuit, configured and arranged to transmit and receive data including video data over the telephone line; a programmable processor circuit configured and arranged for processing captured video and causing image data to be output for display, the programmable processor circuit having a DSP section, including a DSP-type processor, configured and arranged for executing compression/decompression algorithms, and further having a controller section communicatively coupled to the DSP section and configured and arranged for controlling operation of the video monitoring/communication apparatus; a memory circuit configured and arranged for storing executable code for controlling operation of the programmable processor circuit including executable code for compressing/decompressing video data consistent with at least one video-coding recommendation; a way for setting the memory circuit to designate the selected mode for operating the video monitoring/communication apparatus; and a display driver circuit responsive to the programmable processor circuit and configured and arranged to generate video data for a display.

A more specific implementation includes the above arrangement constructed and operating in a security monitoring system. The above programmable processor circuit includes the programmable processor further configured to change the operation of the processor in response to changing the code to permit reconfigurability of the processor.

Other aspects of the present invention are directed to example method and application-specific implementations relating to the above apparatuses.

The above summary is not intended to characterize each embodiment of the present invention. Other aspects of the present invention are provide by way of example upon review of the figures and corresponding description of the drawings.

BRIEF DESCRIPTION OF THE DRAWINGS

Other aspects and advantages of the present invention will become apparent upon reading the following detailed description and upon reference to the drawings in which.

While the invention is susceptible to various modifications in alternative forms, specific embodiments thereof have been shown by way of example in the drawings and will herein be described in detail. It should be understood, however, that it is not intended to limit the invention to a particular form disclosed. On the contrary, the invention is to cover all modifications, equivalents, and alternatives falling within the spirit and scope of the invention was defined by the appended claims.

DETAILED DESCRIPTION

The present invention is applicable to cost-effective secured and security-monitoring applications in which video is processed by an application-programmable circuit, including a programmable general-type processor and a programmable DSP-type processor, for transmission using a conventional transmission channel, including but not limited to POTS, ISDN and T1 lines. The present invention has been found to be particularly advantageous in such applications involving real-time and delayed-time processing of video data; the application-programmable circuit processes video data in response to remotely-generated control input commands and delineates certain information from captured video data based on application-specific programs. Such an arrangement provides for cost-effective security-monitoring implementations using a processor circuit, including a programmable general-type processor and a programmable DSP-type processor, that can be applied to many applications to offset associated costs per circuit. An appreciation of the present invention may be ascertained through a discussion in the context of specific example applications. An appreciation of the invention may be ascertained through a discussion in the context of such a real-time application.

Figure 1A:
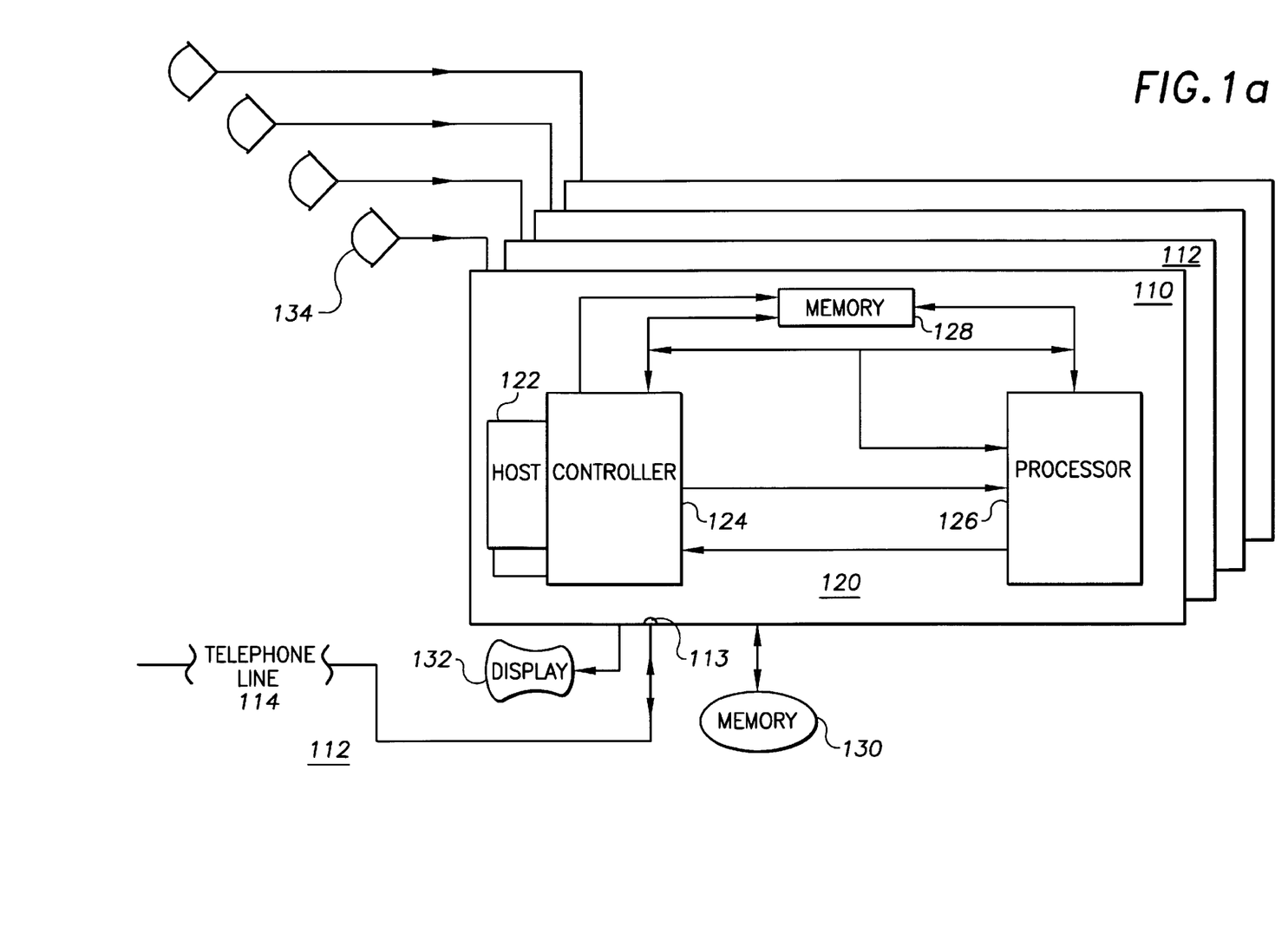
FIGS. 1a and 1b illustrations of example video communication equipment, according to particular embodiments of the present invention.

Turning now to the drawings, FIG. 1a illustrates an example videophone communication system, according to a particular embodiment of the present invention. The system of FIG. 1a includes a first terminal 110 communicating with a second, similarly-constructed terminal 112. The communication takes place using a conventional modem circuit (or transceiver) 113 for transmitting (and receiving) audio and video data over a communications channel, as depicted by telephone line 114.

In a certain example embodiment, the first terminal 110 is implemented in a manner consistent with one of various models available from 8×8, Inc., now Netergy Networks, Inc., of Santa Clara, Calif. Such models include the VC50, VC105, VC150 and RSM1500. The RSM1500 model is one particular example apparatus useful as a signal processing equipment from which embodiments of the present invention can be implemented, and brochures thereof are incorporated herein by reference in their entirety as Appendices A ("Remote Surveillance Module/Installation and Operation Manual, Model RSM1500"), B (Brochure: "RSM1500 From Wherever You Are Watch Your Stuff"), and C (Brochure: "RSM1500 Remote Surveillance Module"). It will be understood, however, that for certain aspects and features discussed herein, programming modifications to such equipment is needed.

The communications channel 114 can be implemented using a variety of available pathways, including use of a server and various conferencing and messaging functions as may be provided through a central office (not shown), and including a POTS line, cellular, other wireless and other digital communication media.

For further information concerning the construction and operation of such video-communication units, reference may be made to 8×8's manuals and brochures for its various models, and to the above-referenced U.S. patent application Ser. No. 09/005,053, filed on Jan. 9, 1998 now U.S. Pat. No. 6,124,882, issued Sep. 26, 2000 (Docket No. 11611.51-US-01), incorporated herein.

The terminal 110 includes a processor circuit 120 with separate sub-circuits, including an optional host 122, a controller 124, a dual processor arrangement 126 and a memory 128. The processor circuit 120 is communicatively coupled to an external storage medium, depicted as memory 130, to a display 132 and to a camera 134. The memory 130 can be implemented in any of a variety of forms, including VCR, hard disc drive, CD, etc. The camera 134 can be implemented using, for example, a frame grabber camera, or a conventional CCD-type digital camera as is used in and with camcorder apparatuses. Alternatively, the camera 134 can be implemented using an analog camera and an NTSC/PAL decoder, such as the BT827 available from Brooktree, Inc., and either camera arrangement can be implemented internal or external to a housing enclosing the processor circuit 120 and its related circuits.

According to certain embodiment of the present invention, the terminals 110 and 112 are similarly constructed. For example, each of the terminals 110 and 112 can include a similarly constructed architecture as described above. Further, depending on the application, the respective processor circuits of the terminals 110 and 112 can have the same programs, with each such program including independently executable subprograms that are selected for execution using a programmable code. For example, as described in U.S. Pat. No. 5,379,351, the dual processor arrangement 126 of FIG. 1 can include a programmable code to indicate which of a number of possible video compression/decompression modes should be executed for a given application. Examples of the video compression/decompression modes include but are not limited to CCITT, CTX, H.320, H.323, and H.324. Much of the overall executable code can be implemented as code that is common to each such stored subprogram, and the dual processor arrangement 126 permits this operable flexibility. Such programmability is advantageous for a variety of reasons, including that it permits a significant reduction in terms of cost per unit and permits the desired flexibility for modification after initial programming.

While the intended operation of each unit can be factory programmed and altered by reprogramming, this type of code programmability is also advantageous in that it permits for usage-directed configurability after the video equipment leaves the factory. According to the present invention, the terminal 110 can be operated as a local video communicator arranged to monitor an environment and to report captured video images (and audio signals as the application may require) to another terminal 112 which is located, for example, at a remote site. With application flexibility provided by way of stored subprograms, one stored subprogram is directed to operating one of the otherwise identically-constructed terminals 110 and 112 as the local video monitor and another terminal as a terminal 112 (located, for example, at a remote site) to which the former terminal reports. The code is used designate one or more selected subprograms to be executed, and/or to designate (for example, using a password) the ability of any particular video processing unit to communicate with another video processing unit.

Figure 1B:
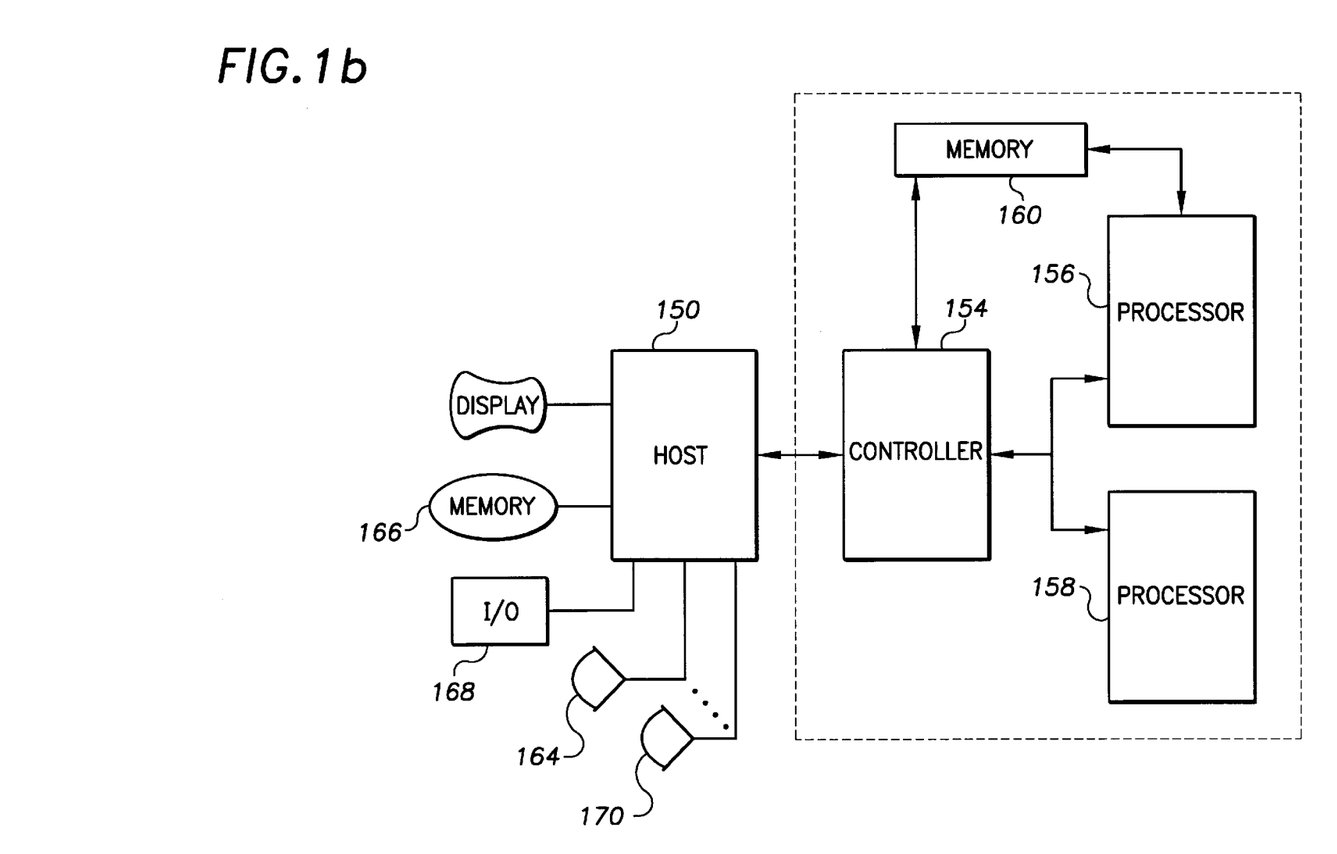

Accordingly, in a specific embodiment thereof, each of these terminals is programmed with a code, one code designating one operation and another code indicating another operation. The codes can be programmed using a digital or analog switch detectable by the processor arrangement. Various implementations include but are not necessarily limited to: a code that is downloadable from a host processor (e.g., 122 of FIG. 1a) with the host processor being a computer such as a personal computer (PC); a binary switch located on a part of the video equipment and accessible to a user; and a signal such as a DTMF sequence input from a telephone and receivable through a transceiver (e.g., 113 of FIG. 1a). It will be understood that processor arrangements other than the example arrangement of FIG. 1a can be used in connection with the present invention. FIG. 1b, for example, illustrates another embodiment in which an optional host 150 communicates with a processor arrangement having as subcircuits a controller 154, a dual video processor arrangement including processors 156 and 158, and a memory 160. For further information concerning other example implementations of the above-discussed subcircuits and concerning example detailed architectures of, and variations to, the processor circuit 120, reference may be made to U.S. Pat. No. 5,379,351, and to one or more of the previously-identified patent documents.

In specific applications consistent with the present invention, the example processor arrangement of FIG. 1*b* is particularly useful where one or more local video communicators are arranged to monitor multiple view areas and to report corresponding video (and audio as may be desired) to a remotely-located terminal of the same or a different construction type. In this type of application, as will be further discussed below, the dual video processor arrangement including processors 156 and 158, with each processor 156 and 158 separately used to process (using programmed compression/decompression programs) video signals input from different video sources. For example, processor 156 can be separately processing video signals from any one of a camera 164, a storage medium (e.g., memory 166), and an input/output device, while the other processor 158 simultaneously processes video signals input from another camera 170. Other combinations of multiple video input sources can be simultaneously processed as well.

As another variation also consistent with the present invention, with the host being an optional part of the overall arrangement, the controller of either FIG. 1*a* or 1*b* can be directly or indirectly coupled to peripheral devices, such as the illustrated displays, transceivers, memories (e.g., 130) and/or cameras.

Figure 2:
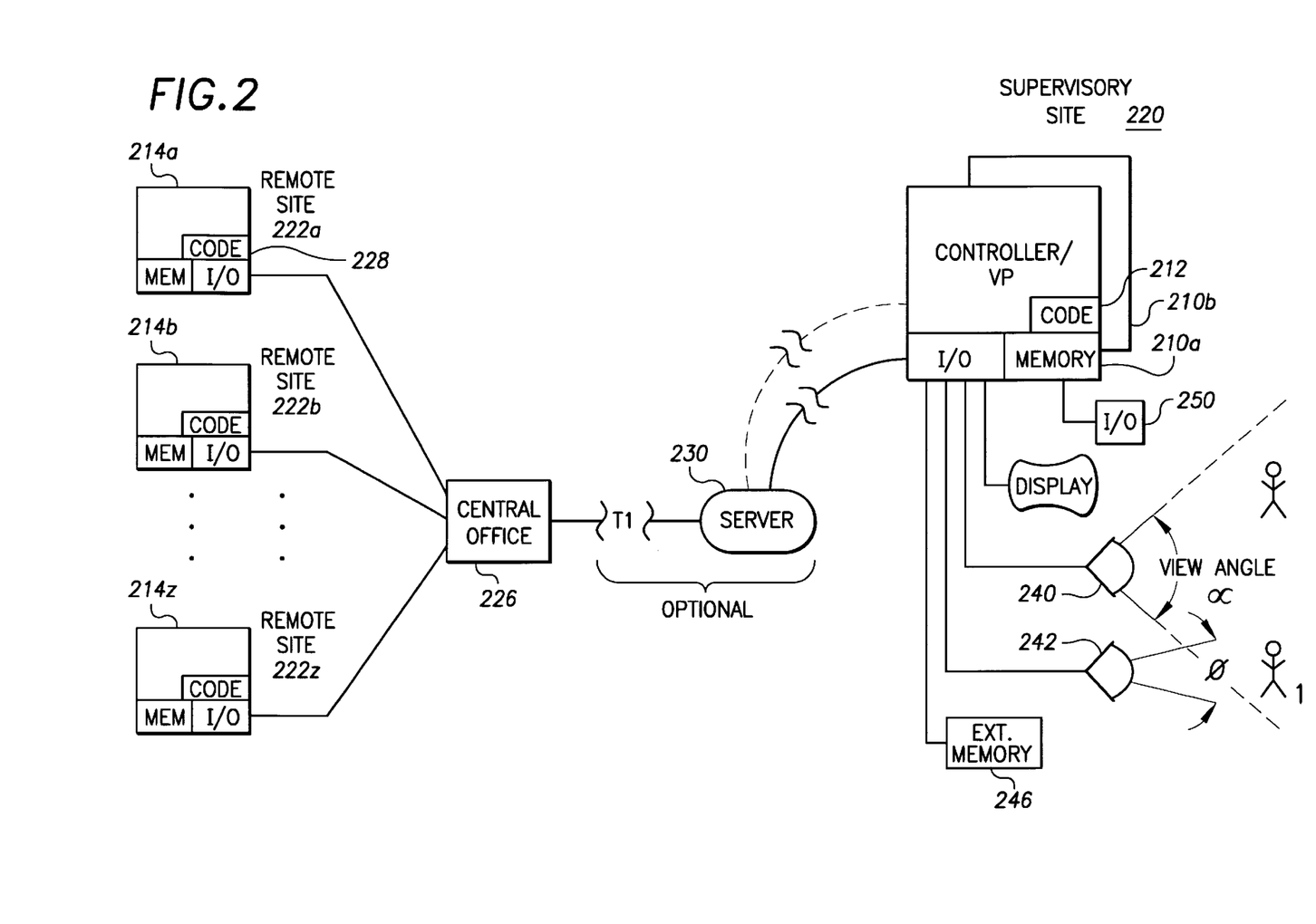
FIG. 2 is an example video communication system, according to particular embodiments of the present invention.

FIG. 2 illustrates a video communication arrangement, according to the present invention, useful for a variety of applications. According to one embodiment, the arrangement includes video processing units 210*a*, 210*b* designated, for example, by code 212, to operate at a supervisory level, and other remotely-coupled video processing units 214*a*, 214*b* through 214*z* (at sites 222*a*, 222*b* through 222*z*, respectively) similarly designated to operate at a subscriber level. Each of the video processing units can be configured and arranged as described above in connection with FIGS. 1*a* and 1*b*.

One application of this particular example embodiment is a one-time pay, or subscription-based, monitoring facility. Types of one-time pay, or subscription-based, monitoring facilities include highway toll-booth and commercial parking garage facilities, where a fee is paid for access to the road or garage parking space. In these applications, it is often desirable to ascertain: the identity of the vehicle driver, whether the operator of the vehicle actually paid the requisite fee, and/or events in connection with the vehicle during certain periods of time (e.g., vehicle tampering). Other example types of subscription-monitoring facilities include child day care and pet care facilities, where care for an individual's child and/or pet is assumed by the facility at a supervisory site 220. In each instance, according to the present invention, the video processing unit can optionally include a decoding program to identify a target (e.g., child, pet, vehicle) that is being monitored and associate this information based on fee-payment, demographics, quality of care, security integrity, etc., as the application requires.

Because of the ability to construct the video processing units inexpensively, portably and coupling to already-existing equipment (such as conventional TV-type displays and standard DTMF telephones), supervisory site 220 can be either a professional commercial business or one or more licensed homes. In either situation, video processing units 214*a*, 214*b* through 214*z* are remotely coupled to the supervisory site 220 through a telephone line with connectivity provided by a central office 226.

Each of the video processing units 214*a*, 214*b* through 214*z* is used by the individual relinquishing care of the child or pet to the facility at a supervisory site 220. In one particular application, the video processing units are owned by the facility and respectively loaned to the relinquishing individuals upon commencement of the assumed care. A relinquishing individual then monitors the care provided by the facility using the connection provided by the central office 226. The relinquishing individual and the facility then exchange the video processing unit to the facility when the child or pet is picked up, typically with payment to the facility for proper care of the child or pet. In another particular application, the video processing units are owned by the relinquishing individuals, with the facility enabling access to video monitoring of the supervisory site 220 upon commencement of the assumed care. The video processing units can be purchased independent from the facility, directly from the facility and/or can also be communicatively compatible units manufactured by different companies and having different processor architectures. In another particular application, the remote-site video processing units are leased on a long-term basis with relinquishing individuals as system subscribers and with video processing unit sustaining communication ability for the remote-site video processing units upon each established connection via the central office 226, or by programming the unit with an update code (e.g., 228 of video processing unit 214*a*). In yet another particular application, the facility operates using a combination of these practices, with some of the remote-site video processing units being loaned and others owned by the facility and/or remote users. In each instance, the above-discussed "code" can be used (the supervisory processing unit or the server) to control the ability of each remote video processing unit to communicate with the supervisory processing unit.

In another important embodiment of the present invention, the system arrangement of FIG. 2 is used as a security monitoring arrangement for one or more video processing units 214*a*, 214*b* through 214*z* at remote sites. The above-mentioned RSM1500 model video communicator available from 8×8, Inc. is an example unit that can be used on both sides of the central office for this embodiment. Access to the images at the supervisory site (e.g., a retail store, factory, medical situation, etc.) is provided to a particular remote-site video processing unit FIG. 2 also shows, as optional equipment for inclusion, a server 230 communicatively intercoupled (e.g., using a POTS line, the illustrated T1 or other high-throughput line) between the central office 226 and the supervisory site 220. In this adaptation, the server 230, which can be any of a number of server types (including the Internet), can on either side or the central office 226 or between two such central offices. The server 230 acts as a video-signal coordinator to permit a large number of remote-site video processing units to communicate with one or more supervisory video processing units 210*a* and 210*b*, based on an immediately-established (on-line) or previously-established business arrangement/payment.

In one particular server implementation, the server 230 is located at a central facility independent of the supervisory sites. This facility independence provides an independent entity the ability to provide a security video-monitoring service to a volume of supervisory sites, the volume being limited only by the communication line bandwidth and signal processing limitations imposed by the equipment selected for the implementation.

In another particular server implementation, the server 230 is located at one of the supervisory sites. This facility dependence permits a monitoring arrangement that differs from that which is discussed above. In this implementation, multiple video processing units at the site 220 can connect to the server 230 and, via the central office 226, can communicatively link to any one of the remote sites 222a, 222b through 222z. Such a configuration is advantageous for business facility applications, for example, in which multiple employees at the site 220 desire to video communicate with video processing units at one or more remote sites. One modification to this arrangement employs a second server on the remote side of the central office 226, wherein the video processing units 214a, 214b through 214z are operated by employees at a remote-located affiliated business. The code can be used in this situation to limit usage times of one or both servers.

In any of the above server-based applications, display functionality to the remote user, or to the server operator, can be enhanced by providing an arrangement of video processing units to display multiple areas, objects or sites on a single screen to any particular display. This can be accomplished using a multi-point video communication arrangement as described and illustrated in U.S. patent application Ser. No. 09/132,300, filed Aug. 11 1998 (Docket No. 8X8S.205PA). With multiple areas being arranged as an output of one video processing unit, the server (or any video processing unit receiving this signal) can use this signal for local display or transmit the signal for display at any site.

Further, using this system adaptation of FIG. 2, each of the afore-discussed features and architectures can be used to permit signal coordination coupling a multitude of remote-site supervisory video processing units with multiple-application supervisory video processing units. For example, the server 230 can be used to link code-enabled remote-site supervisory video processing units with one supervisory video processing unit 210a located at a retail store for monitoring store operations (such as use of the cash register and employee behavior), while another supervisory video processing all unit 210b is located at a child day care facility for monitoring the care-quality of the child. A video monitoring application of this type can be administered, maintained and set up by an independent business, with the multitude of video processing units used to reduce the overall cost/per video processing unit.

For adaptations in which it is desirable to monitor multiple areas, multiple cameras 240 and 242 can be used by the same supervisory processing unit 210a, with one camera 240 designated (optionally code designated) to provide a wide-angle view of the multiple areas. The other cameras or camera 242 can be used to capture and communicate more particular images of a selected area or of a selected movable tangible, such as a person, pet or object. By inputting commands from a remote site (e.g., using DTMF phone key commands), a memory 246 can be used to playback selected images that have been automatically recorded or recorder per customized commands (input at the supervisory site or input remotely during a video call). These automatic recordings can be made from images captured by the wide-view camera 240 and/or by other cameras 242. In response to commands received by the video processing unit 210, such playback modes can include designated time segments (with or without reverse and/or fast play), sequences of still images captured at timed intervals, and designated blocks of time before and after events triggered, for example, by sound or other input alarms provided by way of I/O device 250.

In another mode that is consistent with this multiple camera arrangement, the multiple cameras at the site 220 provide still-image displays that are sequenced for a user at a remote site. Each camera is designed to track and display using interframe (using a still frame) at start up and each camera updates images based upon a comparison of newly captured images and updates images (intraframe) by comparing the previously-captured frame to the current frame. Significant changes can be used to trigger security alarms (e.g., as a motion detector) via I/O device 250 and for faster display-image convergence at the remote site. For further information concerning such image updates, reference may be made to U.S. patent application Ser. No. 08/944,311, filed Oct. 6, 1997 now U.S. Pat. No. 6,075,554, Jun. 13, 2000 (Docket No. 8X8S.14USI1), incorporated herein by reference.

Figure 3A:
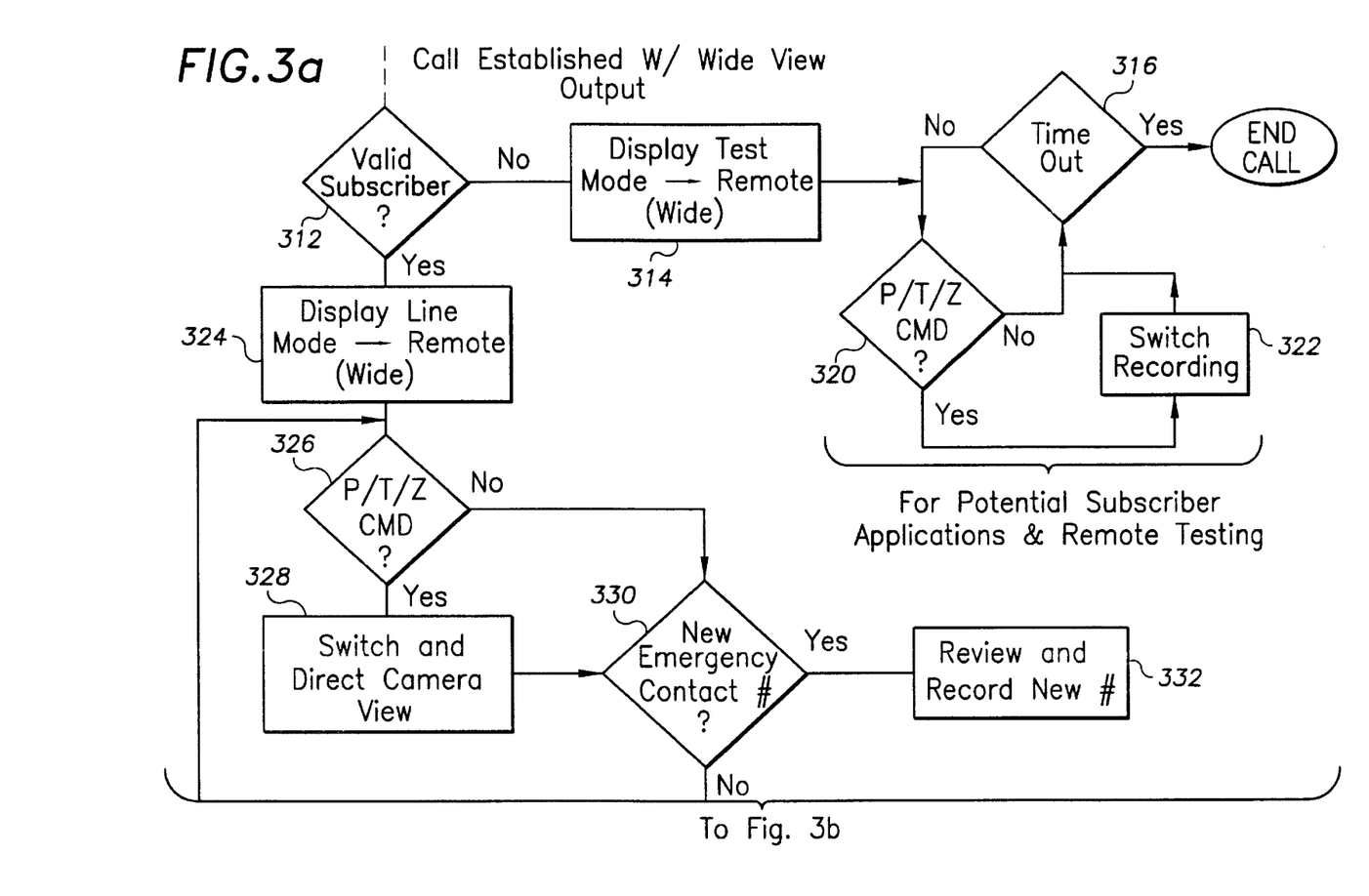
FIG. 3 is an example flow chart used to show various aspects, implementations and applications of the video communication system of FIG. 2, according to the present invention.
Figure 3B:
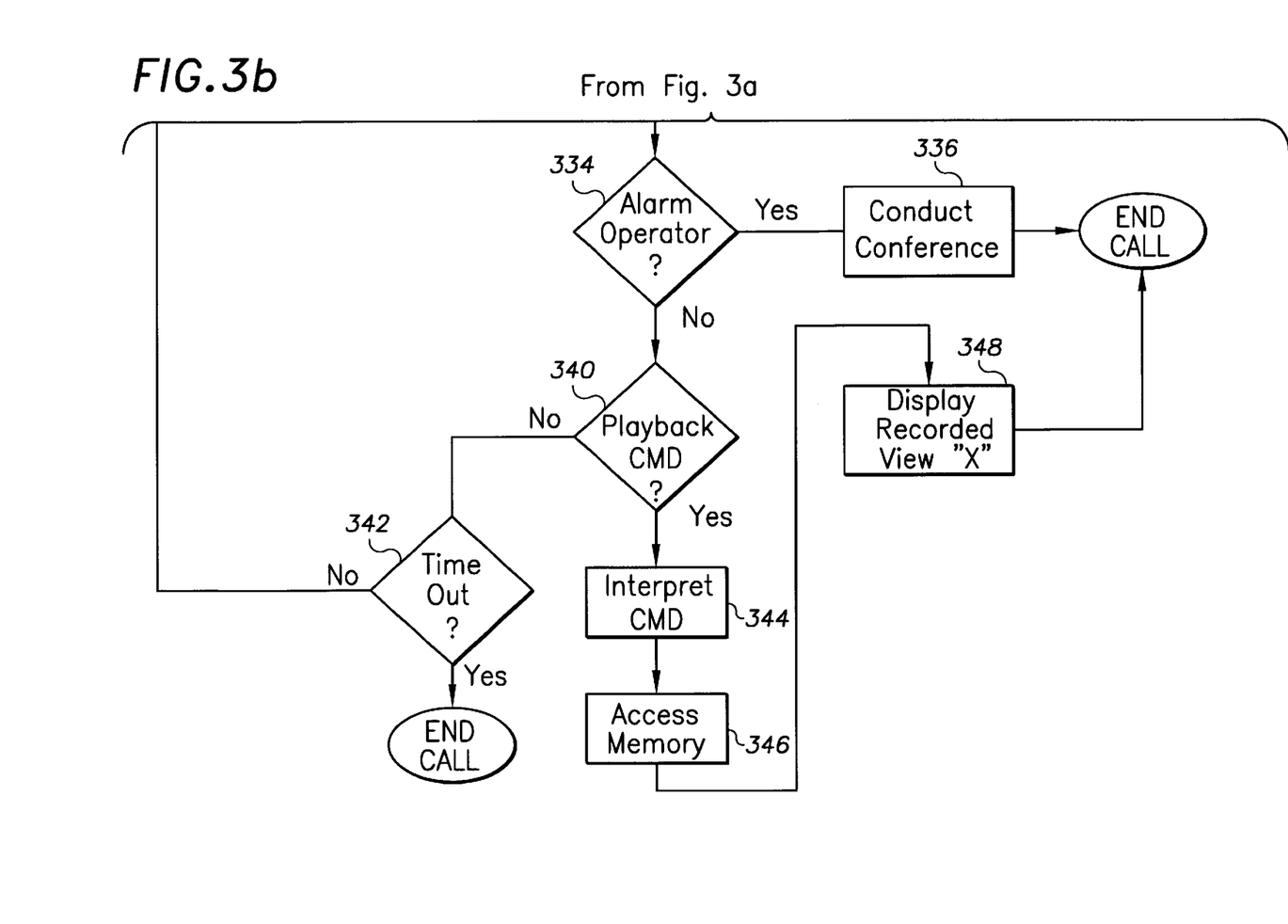

FIG. 3 illustrates an example operational flow for a supervisory processing unit (or equivalent function implemented by a server) in a video communication arrangement consistent with the applications discussed above in connection with FIG. 2. The illustrated flow begins with a call being established between a remote site and a supervisory site. Block 312 through 322 pertain to applications in which access to certain images captured by the supervisory processing unit are limited to qualified subscribers.

At block 312, the supervisory unit determines if the remote unit constitutes a valid subscriber. If the remote unit does not constitute a valid subscriber, flow proceeds to block 314 where the supervisory unit initiates a recorded display mode. To simulate the system's ability consistent with the multiple cameras of FIG. 2, the supervisory unit accesses from its memory a wide angle video segment and returns such signals via the communication link to the non-subscriber remote unit. After permitting a timed period of display, the supervisory unit terminates the call, as shown by way of block 316.

The supervisory unit can also return, with the video signals to the non-subscriber remote unit, text and/or audio information explaining how the remote unit can become a subscriber. The instructions can include command information informing the remote unit of the ability to command the supervisory unit to change views for a more specific image, such as by a pan/tilt/zoom command to the monitoring camera or by changing camera views as discussed in connection with FIG. 2. Accordingly, the supervisory unit can determine if such a camera-view control command has been received (block 320) and, in response, retrieve pre-selected video recordings from memory and return images that appear to be responsive to the received camera-view control command (block 322).

For further information concerning such camera-view control and concerning command operation from a remote unit, reference may be made respectively to U.S. patent application Ser. No. 08/861,619, filed May 22, 1997 (Docket No. 8X8S.47US01) and U.S. patent application Ser. No. 09/095,448, filed Jun. 10, 1998 (Docket No. 8X8S.51CIP1), each incorporated herein by reference.

From block 312, if the remote unit constitutes a valid subscriber, flow proceeds to block 324 where the supervisory unit initiates a live display mode for viewing by the remote unit. At block 326, the supervisory unit checks if a camera-view control command has been received and responds accordingly with actual live-display change for the remote unit, as depicted at block 328.

At blocks 330 and 332, the supervisory unit determines if a command has been received that informs the supervisory unit of a new emergency contact phone number for reaching the relinquishing individual. If such a command has been received, the supervisory unit responds accordingly by acknowledging to the remote unit and noting (and recording) the same for the care provider, as depicted at block 332.

At blocks 334 and 336, the supervisory unit checks if a command has been received that informs the supervisory unit of the need for person-to-person conferencing (video and/or oral) between the care provider and the user of the remote unit. If such a command has been received, the supervisory unit responds accordingly by converting the display monitoring mode to a live call, as depicted at block 336. This can be accomplished by switching cameras to a camera focusing on a care provider or by converting one of the supervisory processing units to act as a normal audio-only telephone. For further information concerning such a video processing unit acting as an audio-only telephone, reference may be made to U.S. patent application Ser. No. 08/934,179, filed Sep. 19, 1997 now U.S. Pat. No. 5,966,165, issued Oct. 12, 1999 (Docket No. 8X8S.38US01), incorporated herein by reference. Once the conference has been completed, the communication session is terminated.

If an "alarm-type" command has not been received, flow proceeds from block 334 to block 340 where the supervisory unit determines if a video playback command has been received. If a video playback command has not been received, flow proceeds from block 340 to block 342 where the supervisory unit determines if the call session with the subscriber has timed out and, if the call has timed out, the call is terminated. If the call has not timed out, flow returns to block 326 for actions as discussed above.

If a video playback command has been received, flow proceeds from block 340 to block 344 where the supervisory unit responds by interpreting the type of command received, as depicted at block 344, and then accessing memory (e.g. 246 of FIG. 2) to playback selected recorded periods, areas and/or objects, as depicted at blocks 346 and 348. Once the conference has been completed, the communication session is terminated.

In accordance with the present invention, one or more of various types of video playback commands are received and acted upon. Example types of commands include: time period before and/or after a triggered event; time period of wide view camera and/or selected focused view camera; freeze frame of activity every "N" minutes for a designated time period; and all recording (wide view and focused view) for selected individual (e.g., customer, child or pet). For conventional information and examples of triggered view-capturing, reference may be made to U.S. Pat. No. 5,581,297 (Koz et al.), entitled "Low Power Video Security Monitoring System."

For playing back a recording for a selected individual, various implementations are feasible. In one such implementation, for instance, each individual wears a special tag, label or clothing ("tagging information") that is coded for interpretation by a decoding routine within the supervisory unit. The decoding routine employs both the wide-angle view and the target-directed view to track those portions of the recording that are pertinent for playback. Using the teaching of the above-incorporated U.S. patent application Ser. No. 08/861,619, filed May 22, 1997 (Docket No. 8X8S.47US01), individual tracking is accomplished by enlarging relevant portions of the overall recorded image for playback to the remote user.

According to one more detailed implementation of the present invention, the tagging information includes a number or code (such as a bar code) that is unique to each individual and that is readily distinguishable by the decoding routine. The decoding routine plays through the recorded video and links those relevant segments requested by the playback command. Once linked, the supervisory unit transmits this information back to the user as requested. This supervisory unit transmission can occur during the call or using a follow-up call initiated by either the supervisory unit or the remote user.

According to another more detailed implementation of the present invention, the tagging information includes a color-code that is unique to each individual and that is readily distinguishable by the decoding routine. The ability to recognize and distinguish is accomplished in connection with conventional compression algorithms in which the luminance data is distinguished from the chroma data for incoming data corresponding to captured images. As is known in the art, human eyes are more sensitive to light than color and, therefore, the luminance data is separated from the chroma data before the data is compressed. By decoding and storing the chroma data after it has been separated from the luminance data, according to the present invention, the matching aspect of the decoding process for each group (e.g., block) of frames is simplified for target recognition and distinction.

According to yet another detailed implementation of the present invention, the tagging information includes both a number or code (such as a bar code) and a color-coded scheme, as described above, for added recognition by the decoding routine.

It will be appreciated that an increased functionality and performance by the decoding routine may unduly burden the processing power of a supervisory unit. In such a situation, the decoding routine can be alternatively implemented by another supervisory unit (e.g., 210b of FIG. 2) having such designated functionality, or by having a server (e.g., 230 of FIG. 2) performing one or more of the recording, linking and decoding functions. Using a server in this manner, recorded information can be forwarded on a regular basis, whether or not requested by the user playback command.

Both the supervisory unit and the remote unit(s) can be program-upgraded by using a remotely-accessed server to control and feed information to the connected terminal. Software-based upgrading in this regard can be particularly advantageous for a subscriber-based video system in that the system manager can verify, market and track subscriber communication and usage before permitting and coordinating such upgrades. Further, in view of the various types of functions that may be demanded in the context of one or more of the above-discussed applications, software upgrading permits the functionality of various units to be upgraded so as to implement additional commands and operations on a cost-per-upgrade basis to further drive down the cost-per-unit and to increase the number applications. For further information concerning such upgrading, reference may be made to U.S. patent application Ser. No. 09/005,291, filed Jan. 9, 1998 now U.S. Pat. No. 6,121,998, issued Sep. 19, 2000 (Docket No. 8X8S.113US01), incorporated herein by reference.

The present invention has been described with reference to particular embodiments and particular applications. These embodiments and particular applications are only examples of the invention's usefulness and should not be taken as a limitation. Various adaptations and combinations of features of the embodiments and particular applications disclosed, and other applications that may benefit from the above architectures and system operations, are within the scope of the present invention.

One such application that may benefit, for example, is the parcel delivery business in which goods are picked up and dropped off according to certain client requests. The video processing units can be placed on each delivery/pick-up vehicle and the goods to be delivered monitored for theft, damage and delivery timing on an as needed, event-triggered (e.g., sound or key-card activation upon pick-up and upon delivery) or using a regular or random time-checking basis. The data recorded for such applications can be archived or disposed of once all interested parties have agreed that the delivery has been appropriately completed or otherwise the account has been settled.

Such embodiments and particular applications are examples only; the scope of the present invention is defined by the following claims.

What is claimed is:

1. A video monitoring/communication apparatus for communicating data including video data over a telephone line and for operating in a mode selected from a plurality of operating modes, the video monitoring/communication apparatus comprising:
   a video source configured and arranged to capture images and to generate video data representing monitored images;
   a telephone line interface circuit, including a signal transceiver circuit, configured and arranged to transmit and receive data including video data over the telephone line;
   a programmable processor circuit configured and arranged for processing captured video and causing image data to be output for display, the programmable processor circuit having a DSP section, including a DSP-type processor, configured and arranged for executing compression/decompression algorithms, and further having a controller section communicatively coupled to the DSP section and configured and arranged for controlling operation of the video monitoring/communication apparatus;
   a memory circuit configured and arranged for storing executable code for controlling operation of the programmable processor circuit including executable code for compressing/decompressing video data consistent with at least one video-coding recommendation;
   means for setting the memory circuit to designate the selected mode for operating the video monitoring/communication apparatus; and
   a display driver circuit responsive to the programmable processor circuit and configured and arranged to generate video data for a display.

2. A video monitoring/communication apparatus, according to claim 1, wherein the memory circuit is further configured and arranged for storing a plurality of video compression/decompression programs, each of the programs corresponding to a respective said at least one of the plurality of different video-coding recommendations.

3. A video monitoring/communication apparatus, according to claim 1, wherein the means for setting the memory circuit includes a programmable memory section that is set via an externally-generated command.

4. A video monitoring/communication apparatus, according to claim 3, wherein the externally-generated command is processed by the controller section of the programmable processor circuit.

5. A video monitoring/communication apparatus, according to claim 4, wherein the externally-generated command sent from a remotely-coupled video communication device.

6. A video monitoring/communication apparatus, according to claim 1, wherein the programmable processor circuit is located at a first site and is communicatively coupled to another programmable processor circuit located at a second site, each programmable processor circuit being configured to operate at least one function that corresponds to either the first site or the second site, depending on its location.

7. A video monitoring/communication apparatus, according to claim 6, wherein the means for setting the memory circuit to designate the selected mode for operating the video monitoring/communication apparatus is located at the first site, and further including another means for setting the memory circuit to designate the selected mode for operating the video monitoring/communication apparatus that is located at the second site, in each instance the means including executable data for downloading a code that designates the selected mode.

8. A video monitoring/communication apparatus, according to claim 1, wherein the means for setting the memory circuit to designate the selected mode for operating the video monitoring/communication apparatus is located at the first site, and further including another means for setting the memory circuit to designate the selected mode for operating the video monitoring/communication apparatus that is located at the second site, in each instance the means including a unique settable code that designates the selected mode.

9. A video monitoring/communication apparatus, according to claim 1, wherein the programmable processor circuit is located at a first site and is communicatively coupled to another programmable processor circuit located at a second site, the programmable processor circuit at the first site configured to command the programmable processor circuit at the second site operate to playback limited amounts of data surrounding at least one designated event.

10. A video monitoring/communication system, comprising:
    a videocommunication server including a plurality of telephone line ports for coupling to remotely-located sites and to at least one wide-bandwidth link;
    a plurality of video monitoring/commnunication apparatuses situated at the remotely-located sites and coupled to the videocommunication server via the telephone line ports, each of the plurality of video monitoring/communication apparatuses configured and arranged for communicating data including video data and for operating in a mode selected from a plurality of operating modes, and each including: a video source configured and arranged to capture images and to generate video data representing monitored images; a telephone line interface circuit, including a signal transceiver circuit, configured and arranged to transmit and receive data including video data over the telephone line; a programmable processor circuit configured and arranged for processing captured video and causing image data to be output for display, the programmable processor circuit having a DSP section, including a DSP-type processor, configured and arranged for executing compression/decompression algorithms, and further having a controller section communicatively coupled to the DSP section and configured and arranged for controlling operation of the video monitoring/communication apparatus; a memory circuit configured and arranged for storing executable code for controlling operation of the programmable processor circuit including executable code for compressing/decompressing video data consistent with at least one video-coding recommendation; means for setting the memory circuit to designate the selected mode for operating the video monitoring/communication apparatus; and a display driver circuit responsive to the programmable processor circuit and configured and arranged to generate video data for a display; and means for tagging captured images with identifying data relative to the video source of the respective video monitoring/communication apparatus;

the videocommunication server configured and arranged for using the identifying data to couple the video data between selected ones of the plurality of telephone line ports and said at least one wide-bandwidth link.

11. A video monitoring/communication system, according to claim 10, further including means, coupled to the videocommunication server through at least one of said plurality of video monitoring/communication apparatuses, for selectively displaying the captured images.

12. A video monitoring/communication system, according to claim 11, wherein the means for selectively displaying images is responsive to the videocommunication server using the identifying data.

13. A video monitoring/communication system, according to claim 10, wherein the means for tagging captured images with identifying data is used in conjunction with at least one of the following: means for appending data coded to captured image segments per remote user; means for tracking facial characteristics of within the captured images; tracking color-coded schemes within the captured images; means for tracking being-related characteristics of within the captured images; and means for tracking badges attached to beings monitored by the video sources.

14. A video monitoring/communication system, according to claim 10, wherein said at least one wide-bandwidth link includes means for processing a multitude of world-wide web data links.

15. A video monitoring/communication system, according to claim 10, further including a display monitoring station coupled to the server via said at least one wide-bandwidth link.

16. A video monitoring/communication system, according to claim 15, wherein the display monitoring station includes means, coupled to the videocommunication server through at least one of said plurality of video monitoring/communication apparatuses, for selectively displaying the captured images.

17. A video monitoring/communication system, according to claim 16, wherein the means for selectively displaying images is responsive to the videocommunication server using the identifying data.

18. A video monitoring/communication system, according to claim 10, wherein the videocommunication server is configured for determining whether the video monitoring/communication apparatuses have communication access to a supervisory video processing unit.

19. A video monitoring/communication system, according to claim 18, wherein the videocommunication server determines whether the video monitoring/communication apparatuses have said communication access by reading a programmable code therefrom.

20. A video monitoring/communication system, according to claim 19, wherein the programmable code is identified to the server by a facility operating the supervisory video processing unit.

21. A remotely-accessed video monitoring apparatus for communicating data, including video data, over a plain old telephone service (POTS) line, comprising:

a video source configured and arranged to capture images and to generate video data representing the images;

a POTS interface circuit, including a modem, configured and arranged to transmit and receive video and audio data over the POTS line;

a programmable processor circuit having a first section, including a DSP-type processor, configured and arranged to encode and decode video data, including the video data generated by the video source, according to a programmed video-coding recommendation, and having a controller section, including a RISC-type processor communicatively coupled to the first section, the controller section executing a stored program for controlling operation of the videophone apparatus in response to user-generated commands;

a memory circuit coupled to the programmable processor circuit and aranged for storing the program for controlling operation of the videophone apparatus;

a display driver circuit responsive to the programmable processor circuit and configured and arranged to generate video data for a display.

22. A videoconferencing apparatus, according to claim 21, wherein the controller section includes at least one of a telephone and a wireless remote unit.

23. A videoconferencing apparatus, according to claim 21, wherein the programmable processor circuit is implemented using at least two intercommunicative integrated circuit packages.

24. A videoconferencing apparatus, according to claim 21, wherein the programmable processor circuit is implemented using one integrated circuit package including both the RISC-type processor and the DSP-type processor.

25. A videoconferencing apparatus, according to claim 21, wherein the first and controller sections of the programmable processor circuit are implemented as part of a single integrated circuit.

26. A videoconferencing apparatus, according to claim 21, wherein the processor circuit is programmed to receive a user-generated command that configures the videoconferencing apparatus to automatically answer a call detected over the POTS line.

27. A videoconferencing apparatus, according to claim 21, wherein the processor circuit is programmed to process video received from one of a plurality of video sources and to respond to a remotely generated "select" command causing one of the video sources to be selected by a remotely-located user.

28. A videoconferencing apparatus for communicating video and audio data over a communications channel, comprising:

means for capturing images and generating video data representing the images;

means for transmitting and receiving video and audio data over the channel;

programmable means for processing having a first section, including a DSP-type processor, configured and arranged to encode and decode video data, including the video data generated by the video source, according to a programmed video-coding recommendation, and having a controller section, including a RISC-type processor, communicatively coupled to the first section, the controller section executing a stored program for controlling operation of the videoconferencing apparatus in response to user-generated commands;

an EEPROM circuit coupled to the programmable means for processing and arranged for storing the program for controlling operation of the videoconferencing apparatus;

a display driver circuit responsive to the programmable means for processing and configured and arranged to generate video data for a display; and a housing arrangement, enclosing the means for capturing images and generating video data representing the images, the means for transmitting and receiving video and audio data, the programmable means for processing, the EEPROM circuit, the display driver circuit, and constructed and arranged to mount adjustably on the top of the display.

29. A videoconferencing apparatus, according to claim 28, wherein the programmable means for processing is programmed to receive a user-generated command that configures the videoconferencing apparatus to automatically answer a call detected over the communications channel.

30. A videoconferencing apparatus, according to claim 28, wherein the programmable means for processing is programmed to process video received from one of a plurality of video sources and to respond to a remotely generated "select" command causing one of the video sources to be selected by a remotely-located user.

31. A videoconferencing apparatus, according to claim 28, wherein the programmable means for processing is programmed to process video received from one of a plurality of video sources and to respond to a remotely generated "select" command causing one of the video sources to be selected by a remotely-located user, and wherein the programmable means for processing is further programmed to receive a user-generated command that configures the videoconferencing apparatus to automatically answer a call detected over the communications channel.

* * * * *